June 26, 1923.

H. A. COLE 1,460,092

APPARATUS FOR DRYING AND POLISHING GLASSES AND ANALOGOUS ARTICLES

Filed March 21, 1921    6 Sheets-Sheet 1

INVENTOR
HENRY A. COLE, by
Henry T. Bright
Atty.

June 26, 1923.

H. A. COLE 1,460,092

APPARATUS FOR DRYING AND POLISHING GLASSES AND ANALOGOUS ARTICLES

Filed March 21, 1921  6 Sheets-Sheet 2

INVENTOR
HENRY A. COLE,

June 26, 1923.
H. A. COLE
APPARATUS FOR DRYING AND POLISHING GLASSES AND ANALOGOUS ARTICLES
Filed March 21, 1921  6 Sheets-Sheet 3
1,460,092
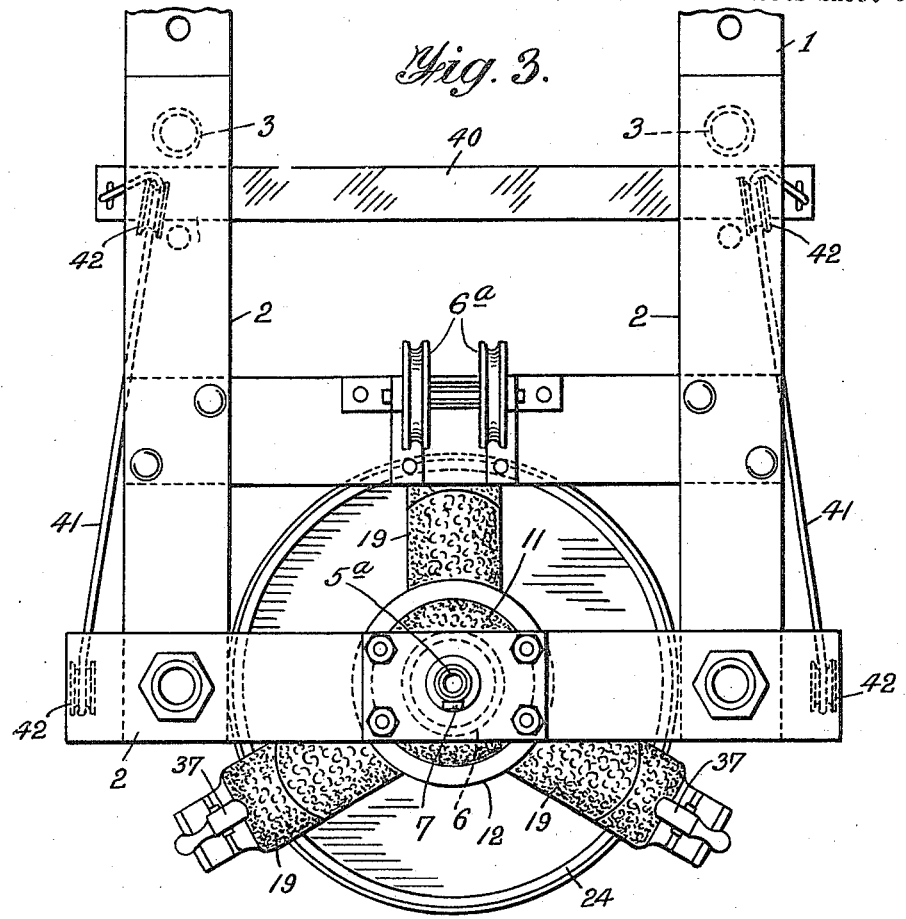
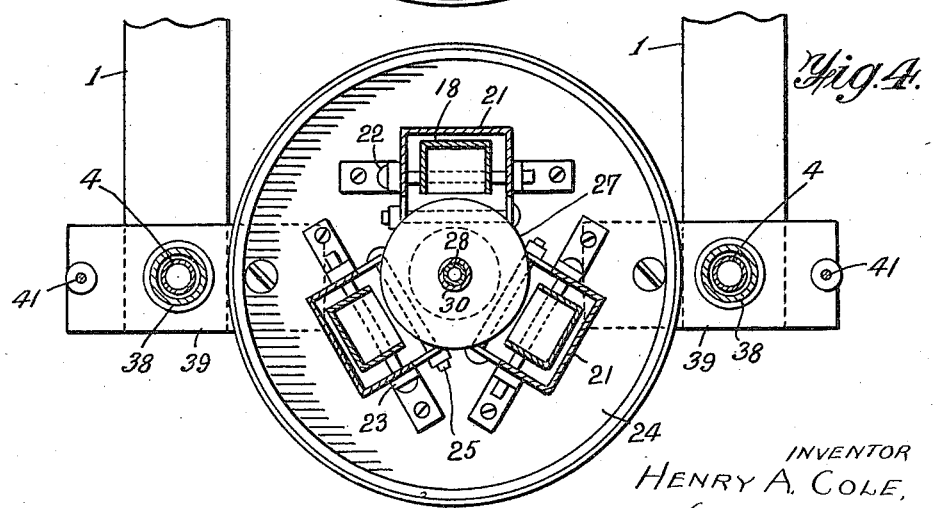
INVENTOR
HENRY A. COLE, June 26, 1923.
H. A. COLE
APPARATUS FOR DRYING AND POLISHING GLASSES AND ANALOGOUS ARTICLES
Filed March 21, 1921   6 Sheets-Sheet 4
1,460,092
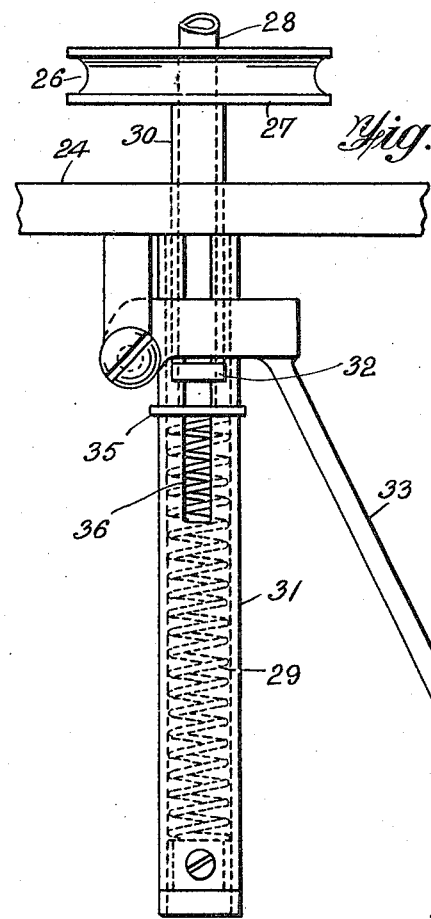
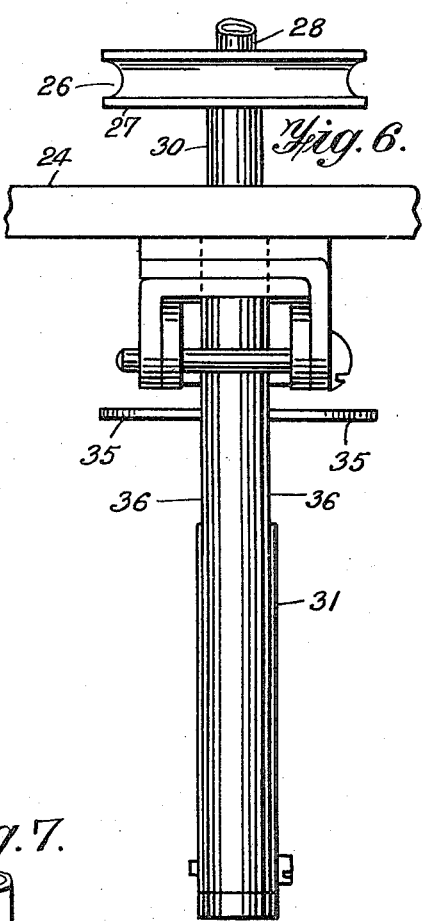
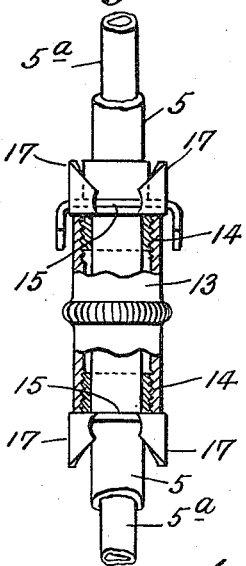
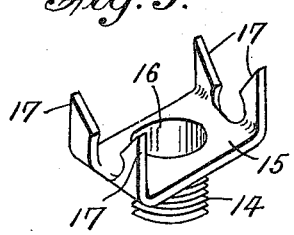
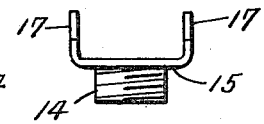
INVENTOR
HENRY A. COLE,
by Henry T. Bright
atty June 26, 1923.

H. A. COLE 1,460,092

APPARATUS FOR DRYING AND POLISHING GLASSES AND ANALOGOUS ARTICLES

Filed March 21, 1921    6 Sheets-Sheet 5

INVENTOR
HENRY A. COLE,
by Henry T. Bright
Atty

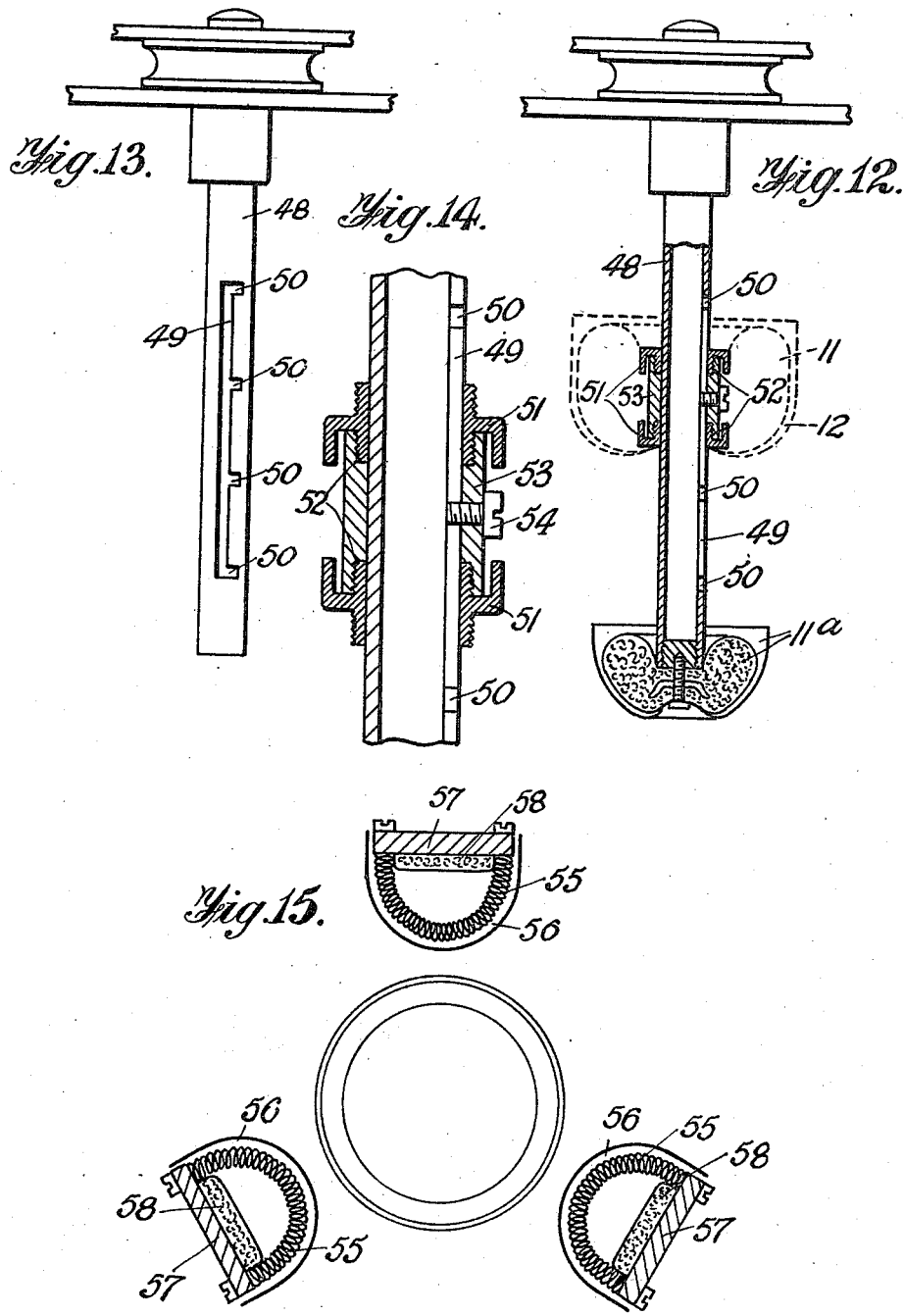

Patented June 26, 1923.

1,460,092

UNITED STATES PATENT OFFICE.

HENRY ALFRED COLE, OF WESTON-SUPER-MARE, ENGLAND.

APPARATUS FOR DRYING AND POLISHING GLASSES AND ANALOGOUS ARTICLES.

Application filed March 21, 1921. Serial No. 454,197.

*To all whom it may concern:*

Be it known that I, HENRY ALFRED COLE, subject of the King of Great Britain, residing at Pier Lodge, Birnbeck Pier, Weston-super-Mare, England, have invented new and useful Improvements in Apparatus for Drying and Polishing Glasses and Analogous Articles; and I do hereby declare the following to be a full, clear, and exact description of the invention, such as will enable others skilled in the art to which it appertains to make and use the same.

This invention has for its object to provide a machine for expeditiously drying and polishing, but more particularly polishing, glasses and analogous articles such as polished metal cups, bowls and other hollow articles.

A machine according to this invention comprises one or more pairs of male and female members having absorbent and polishing surfaces one or both of which members in each pair are adapted to be mechanically rotated and brought into contact with the exterior and interior surfaces respectively of the article to be treated, in such a manner that when drying and polishing the interior surface the article is gripped tightly by the female member and when drying and polishing the exterior surface the article is gripped by the male member by slightly loosening the grip of the female member.

According to one form of the invention the male member consists of a rotatable spindle having a plurality of alternating sponges and pieces of chamois leather or other suitable materials and the female member consists of a plurality of pivoted or swinging frames arranged around a circle having resilient faces, preferably of sponge, over which may be disposed one or more pieces of chamois leather, which swinging frames are normally open but attached to means whereby the same may be closed in towards the centre of the circle so as to grip or contact with the exterior surface of the article to be treated. These means may either be operated by hand or through the medium of a foot treadle.

In order that the invention may be clearly understood one form of the same will now be described by aid of the accompanying drawings in which:—

Fig. 3 is a plan of Fig. 1.

Fig. 4 is a sectional plan on the line 4—4 of Fig. 1, shewing the pads of the female member in the closed position.

Figs. 5 and 6 are front and side elevation respectively of a portion of the mechanism for opening and closing the pads of the female member drawn to a larger scale than the previous figures.

Fig. 7 is an enlarged part sectional elevation of a detail for securing the sponges and pieces of chamois leather on the spindle of the male member.

Fig. 8 is an elevation of one of the coupling elements shewn in Fig. 7 drawn to a slightly larger scale.

Fig. 9 is a perspective view of the same drawn to a still larger scale.

Fig. 12 is a part vertical section of a modified construction of male member in which means are provided for adjustably mounting a single resilient pad or sponge on the stem of the same.

Fig. 13 is an elevation of the stem with the pads removed.

Fig. 14 is a fragmentary vertical section of the modified male member shewing clearly the means for adjustably mounting the pad on the stem.

Fig. 15 is a diagrammatic sectional plan of a female member illustrating a modified resilient support for the polishing surfaces.

Figure 1:
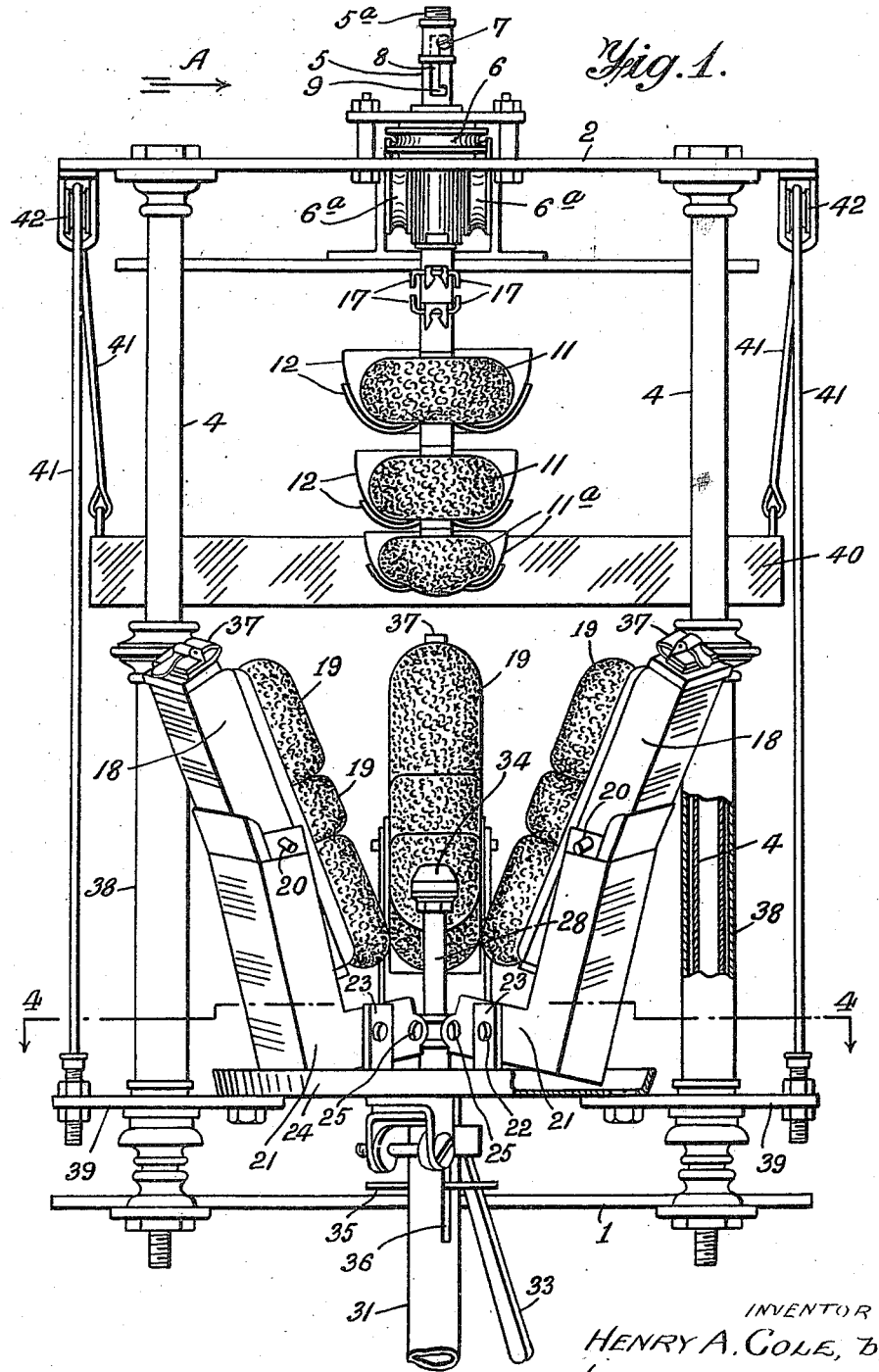
Fig. 1 is a part sectional front elevation of the complete machine.
Figure 2:
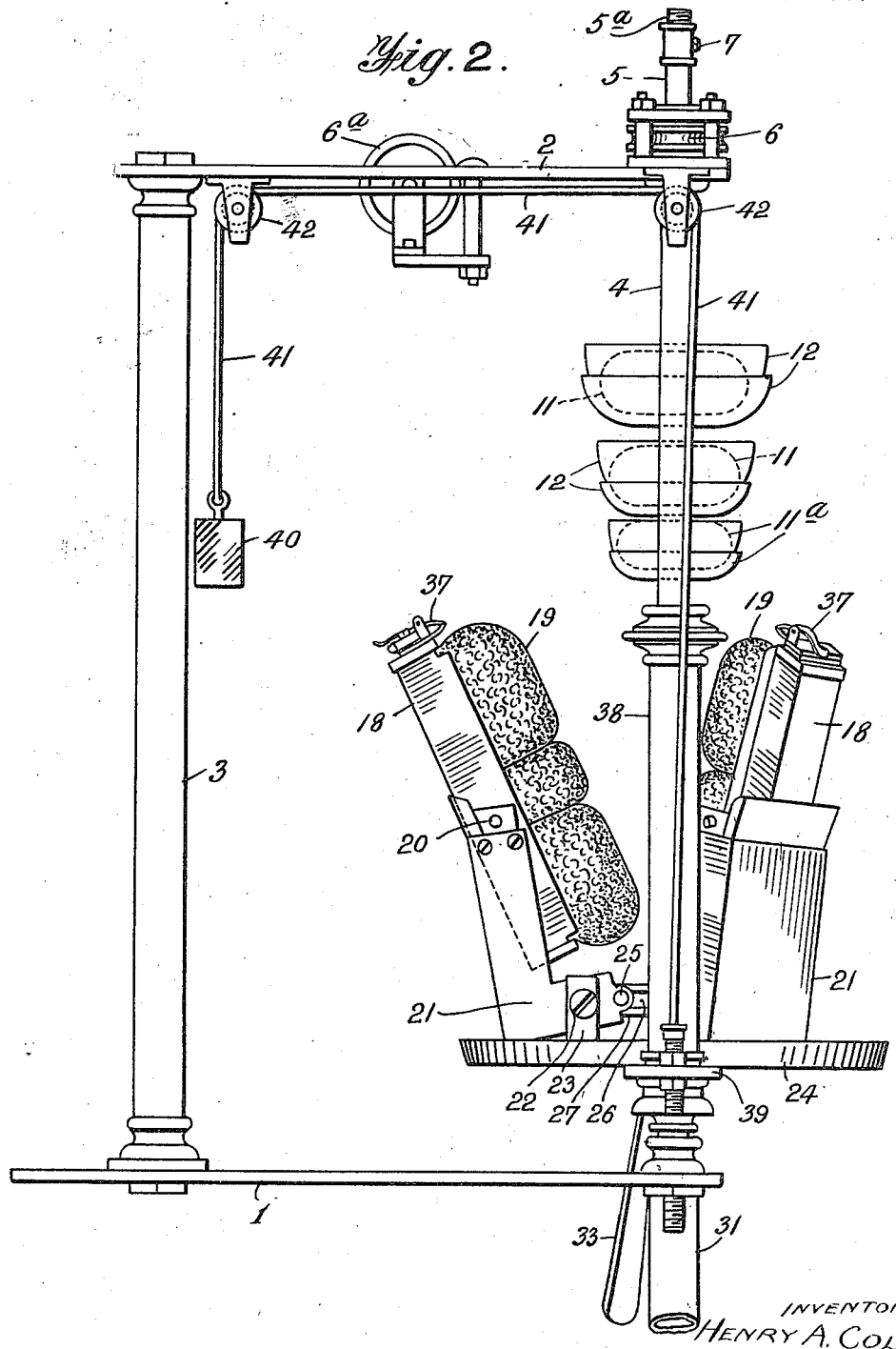
Fig. 2 is a side elevation of the same viewed in the direction of the arrow A in Fig. 1.

The frame of the machine illustrated comprises a base plate 1 and a top plate 2 which latter is supported at each corner by two pairs of uprights 3 and 4. Depending vertically from the top plate 2 and disposed adjacent to the front edge of the same is the male rotatable member which comprises a hollow spindle 5 adapted to be driven through the medium of a pulley 6 from any convenient source of power the belt or the like passing over idle pulleys 6ª, and a further spindle 5ª slidably mounted within the outer hollow spindle 5. Relative rotation between these two spindles is prevented by means of a pin or screw 7 carried by the inner spindle 5ª which pin or screw projects through a slot 8 in the upper end of the outer spindle 5.

The slot 8 is made sufficiently long as to allow of the inner spindle being moved axially a pre-determined distance therein for a purpose hereafter to be explained.

Support for the inner spindle 5<sup>a</sup> in two adjusted positions is provided by forming the extremities of the slot 8 with right angled extensions 9 with which the pin or screw 7 is engaged after each adjustment.

It will of course be appreciated that provision may be made for more than two positions of adjustment by the formation of additional side extensions 9 to the slot 8.

Mounted at spaced intervals upon the outer spindle 5 are sponges 11 and pieces of chamois leather 12 the latter being disposed directly beneath each sponge so that in use the same fold up round the sponges and take the shape shewn in Fig. 1, of the drawings. The preferred means for positioning and retaining these sponges and chamois leather pieces on the spindle 5 is illustrated in Figs. 1, 7, 8 and 9, and comprises tubular distance pieces 13 which are threaded interiorly at each end for the reception of the correspondingly threaded stem 14 of clamping members 15. The bodies of these clamping members are punched or otherwise formed in one piece from sheet metal and provided with a central plain hole 16 which is a tight fit on the exterior of the outer spindle 5. Each clamping member is formed with four upstanding pointed projections 17 disposed at the corners of two opposite sides only of each member the remaining sides being straight as shewn most clearly in Fig. 9. In assembly a sponge and one or more pieces of chamois leather are impaled upon the projections 17 in the order aforementioned. A further clamping member is then forced through each of the impaled sponges and pieces of leather with its projections at right angles to the projections of the first mentioned clamping member as clearly illustrated in Figs. 1 and 7.

The sponges and their complementary pieces of leather are thus securely held between opposing clamping members and such members are maintained in the desired spaced relationship by the distance pieces 13.

The lowest sponge and piece or pieces of leather which are collectively indicated by the reference 11<sup>a</sup> are secured to the lower end of the inner spindle 5<sup>a</sup> so as to be movable therewith. By this means such sponge and leather 11<sup>a</sup> may be used separately from the other sponges 11 and leathers 12 as when operating on small articles such as wine glasses for which purpose the spindle 5<sup>a</sup> is lowered in the manner aforementioned. When the sponge and leather 11<sup>a</sup> are in the raised position shewn in Fig. 1. they are used collectively with the other sponges and leathers for drying and polishing the interiors of larger articles such as tumblers and metal cups. The female member for drying and polishing the exteriors of the articles to be treated comprises, in the example illustrated, three rectangular frames 18 carrying one or more sponges 19 which frames are pivotally supported as at 20 within the upper ends of right angled lever members 21 which in turn are fulcrumed at 22 between upstanding ears 23 carried by a dished base plate 24. The inner ends of these lever members 21 are each provided with a transverse pin 25 which engage a circumferential groove 26 in a ring member 27. Formed integral with or otherwise permanently attached to the under side of base plate 24 is a casing 31 that is closed at its lower end and has disposed therein an expansion coil spring 29 which reacts from the closed lower end of the casing against the lower end of a spindle 28 that is slidably mounted in a sleeve 30 which sleeve in turn is slidably mounted in the casing 31. The sleeve 30 at its lower end rests against a pair of wing pieces 35 that project laterally from the lower end of the spindle through slots 36 in the casing 31 and through the spindle 28 and its wing pieces, is supported upon the spring 29. At its upper end said sleeve carries the ring member 27. At or near its lower end the sleeve 30 is provided with a lateral projection 32 that is adapted to be engaged by a pivoted hand lever 33 thereby to depress the ring member 27 and turn the lever members 21 about their fulcrums to close the sponges 19 about the exterior surface of an article to be treated. In use, the operator with one hand grasps the casing 31 and with the other hand places the article to be treated against a soft pad or knob 34 on the upper end of the spindle 28 and by downward pressure on the article depresses the spindle against the spring 29 until the upper end of the article is approximately level with the upper ends of the sponges 19, the amount of such depression of the spindle being determined by the use of the hand gripping the sleeve 31 as a stop engageable by the wing pieces 35. The hand lever 33 is then operated to close the sponges 19 against the article. When the lever is released the spring 29 acts to return all parts to their normal position.

The upper ends of the rectangular frames 19 are each provided with a spring grip appliance 37 by means of which one or more pieces of chamois leather, not shewn, may be disposed and supported over the sponges 19. A single piece of leather is preferred as being more convenient to use.

The whole of the female member is movable vertically for which purpose it is connected to the lower ends of hollow guides 38 (which slidably engage the columns 4) by means of connecting pieces 39 the inner ends of which are bolted or otherwise connected to opposite sides of the dished base plate 24. The weight of this female member is counterbalanced by a weight such as 40, which is suspended by cords or the like 41, passing over pulleys 42.

In operation the glass or the like is positioned within and gripped by the female member in the manner aforementioned. The female member is then elevated until the male member is fully within the interior of the glass or the like it being understood of course that the male member is continuously rotating at a high speed during the drying and polishing of the interior of the glass or the like by means of the male member. The jaws, that is the frames 18 and sponges 19, of the female member are caused to tightly grip the glass or the like by pulling in the hand lever 33 so as to prevent the glass or the like from rotating. To dry and polish the exterior of the same the glass or the like is pushed firmly up against the male member when the grip of the female member is slackened sufficiently to allow the glass or the like to rotate with the male member but insufficient to entirely remove the jaws of the female member from frictional engagement with the exterior of the glass or the like.

I wish it to be understood that I may provide any suitable means for retaining the sponges 19 in position within their frames 18. For example I may enclose the inner ends of each sponge within a metal casing which casings in turn are assembled within a suitable frame, the whole being held firmly in position therein by means of one or more bolts or the like.

Figure 10:
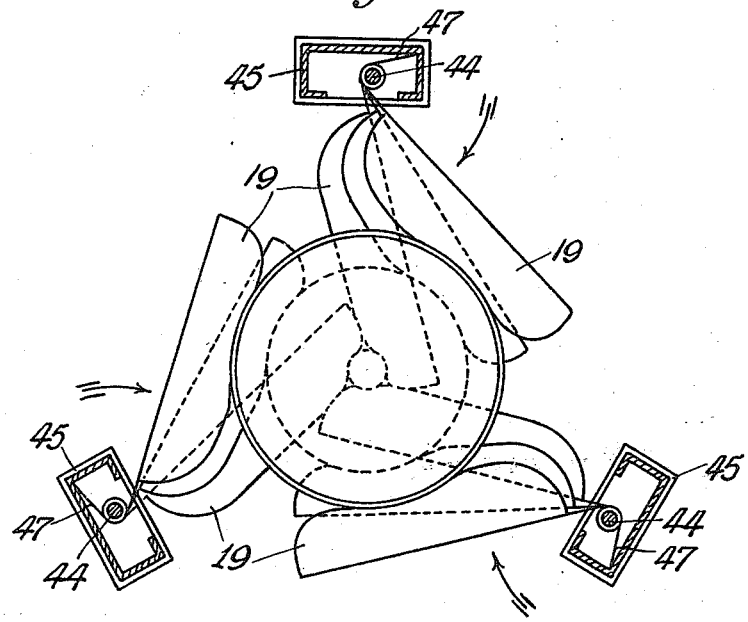
Fig. 10 is a part sectional plan view of a modified construction of female member in which the polishing surfaces are carried by tangentially disposed pivoted frames.
Figure 11:
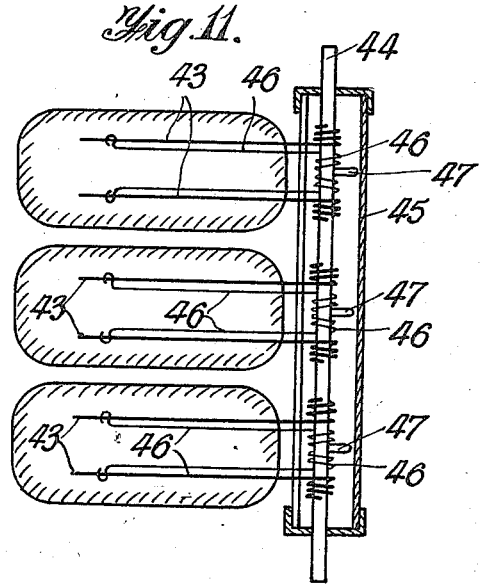
Fig. 11 is a diagrammatic vertical section through one of the frames and its pivot.

In the modified construction of female member illustrated in Figs. 10 and 11 the sponges or the like 19 are each mounted upon a pair of spaced stiffening rods 43 the inner ends of which are loosely coiled around a vertical pivot rod 44 mounted longitudinally within a suitable casing 45. The pivotal or swinging movement of these sponges about their respective rod 44 is resisted in a backward direction by suitable axial springs 46 the inner ends 47 of which bear against the inside faces of their respective casings 45. These springs normally tend to hold the polishing surfaces against the outer surface of the article to be polished which is indicated at 48' as a wine glass or similar article having several diameters. The polishing pads being independently movable are capable of accommodating themselves to articles of various diameters.

The modified construction of male member illustrated in Figs. 12, 13 and 14, is adapted to adjustably carry a single sponge or the like 11 with its leather wrapping 12 for which purpose the stem 48 is tubular and provided with a longitudinal slot 49 having a series of right angularly disposed side slots 50. The sponge or the like and its wrapping are clamped between a pair of flanged end members 51 which are formed with screwed spigots 52 which engage internally threaded recesses in each end of a distance piece 53. This distance piece 53 is slidably mounted upon the stem 48 and is provided with a pin or screw 54 the inner end of which is adapted to engage the aforesaid slot 49. By moving this distance piece up or down on the stem 48 until the inner end of the pin or screw 54 comes opposite one of the side slots 50 and then giving to the distance piece a partial turn, such inner end of the pin or screw is caused to engage said side slot and thus hold the sponge or the like in the required position on the stem.

By means of this modified construction of male member the lower sponge or the like 11$^a$ may be rigidly secured upon the lower end of the stem 48 in which case the inner spindle 5$^a$ is dispensed with.

In Fig. 15 is illustrated a means whereby coiled springs such as 55 are substituted for the sponges described in connection with the arrangement illustrated in the other figures of the drawings. These springs of which there may be any number are bent to the form of a semi-circle over which is stretched the leather or other polishing surface 56. The inner end of the springs are connected to a base member 57, the inside face of which is preferably padded as at 58 to prevent damage to the article being polished should the pressure be sufficient to at any time effect complete collapse of the springs 55.

Having now particularly described and ascertained the nature of my said invention and in what manner the same is to be performed, I declare that what I claim is:—

1. A glass drying and polishing machine comprising an internal polisher, a non-rotatable external polisher having a series of pivoted arms provided with polishing surfaces, means for rotating said internal polisher, and means for moving said external polisher axially relative to the internal polisher.

2. A glass drying and polishing machine comprising an internal polisher, a non-rotatable external polisher including a plurality of pivoted arms, means for pivotally adjusting said arms, polishing elements pivotally supported by the arms respectively, means for rotating said internal polisher, and means for moving said external polisher axially relative to said internal polisher.

3. A glass drying and polishing machine comprising an internal polisher, a non-rotatable external polisher including a plurality of pivoted arms, means movable axially of the external polisher to simultaneously and correspondingly pivotally adjust said arms, polishing elements pivotally supported by the arms, means for rotating said internal polisher, and means for moving the said external polisher axially relative to said internal polisher.

HENRY ALFRED COLE.

Signed in the presence of—
    G. Hughes,
    T. Hughes.